ROSWELL W. GILBERT
INVENTOR.

United States Patent Office 2,950,438
Patented Aug. 23, 1960

2,950,438

APPARATUS FOR MEASURING LARGE D.-C. CURRENTS

Roswell W. Gilbert, Montclair, N.J., assignor, by mesne assignments, to Daystrom, Incorporated, Murray Hill, N.J., a corporation of New Jersey Filed Aug. 30, 1954, Ser. No. 452,883

3 Claims. (Cl. 324—117)

This invention relates to a magnetic converter for the measurement of D.-C. currents and more particularly to a novel such apparatus including a crest-responsive, rectifier type ammeter responsive to the output of a current transductor.

The so-called D.-C. current transformers, or more strictly magnetic converters, are being increasingly used in the measurement of large D.-C. currents in place of the conventional D.-C. instrument and shunt combination. Such magnetic converters offer numerous practical advantages such as simplicity, a high order of accuracy and freedom from compromising design characteristics. In fact, a good magnetic converter, properly operated, is nearly as precise as an A.-C. current transformer.

In my co-pending United States patent application Serial No. 317,898, filed October 31, 1952, now Patent No. 2,729,781, and entitled, Electromagnetic Transformer, I disclose a magnetic converter arrangement consisting of two core sections encircling the bus carrying the D.-C. current, each core carrying separate exciter windings. The cores are tape wound of a material having a rectangular B—H characteristic and a coercivity that is very small relative to the magnetizing force represented by full scale bus current. Thus, when an exciting voltage is applied to the windings an exciting current will develop to the point where the bus magnetization is equalled. At such point, the core abruptly becomes permeable and the magnetic flux swing will limit the exciting current sharply to equality with the bus current multiplied by the inverse turns ratio of the winding to the bus. The exciting windings are cyclically excited by alternating current having a potential time integral per cycle not greater than the flux linkage of the core in terms of potential-time. Thus, excitation swings from core to core before the flux linkage integral of the core can be penetrated, whereby the exciting current is a function of the bus current and, therefore, can be taken as a measure thereof. The exciting windings may be series or shunt connected to source of alternating current and the referenced co-pending application is directed to improved such circuits incorporating rectifier elements to obtain a rectifier pulse operation characteristic.

The present invention constitutes an improvement over that disclosed in my co-pending patent application in that it utilizes a peak-responsive, rectifier type instrument providing an improved order of performance over the root-mean-square (R.M.S.) or average responsive instruments in contemporary use.

An object of this invention is the provision of a novel magnetic converter for the measurement of D.-C. currents.

An object of this invention is the provision of an arrangement for measuring large D.-C. currents and which arrangement includes a crest-responsive, rectifier type indicating instrument.

An object of this invention is the provision of apparatus for measuring large D.-C. currents flowing in a conductor and comprising a pair of cores magnetically coupled to the conductor, exciter windings carried by the cores and connected in series opposition to a source of alternating current, a rectifier network responsive to the current flowing in the exciter windings and a D.-C. indicating instrument and an inductance connected in series across the network output terminals.

These and other objects and advantages will become apparent from the following description when taken with the accompanying drawings. It will be understood the drawings are for purposes of illustration and are not to be construed as defining the scope or limits of the invention, reference being had for the latter purpose to the claims appended hereto.

In the drawings wherein like reference characters denote like parts in the several views.

Figure 1:
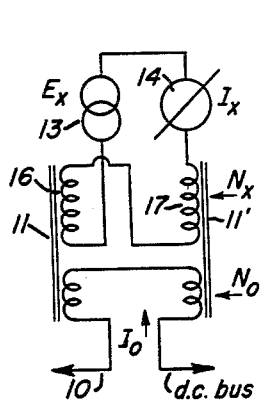
Figure 1 illustrates a magnetic converter of the two-core type arranged for series excitation by a source of A.-C. potential.

Reference is now made to Figure 1. Here the D.-C. current conductor 10, carrying the current $I_0$ is coupled to the exciting windings 16 and 17 by the cores 11, 11'. It is assumed the conductor is coupled to the cores by $N_0$ turns and the exciting windings are likewise coupled by $N_x$ turns. The windings are energized by an alternating current source 13 having a voltage $E_x$ resulting in an excitation current flow $I_x$ through the windings and through the indicating instrument 14. It is here pointed out that the exciting potential is applied to the excitation windings in series opposition to the D.-C. magnetization so that for any instantaneous condition the exciting current is aiding in one core and opposing in the other core. In this arrangement, the cores 11, 11' are alternately balanced, one saturating and the other flux linking, alternately. Preferably, the cores are tape wound of a material having a rectangular B—H loop and a coercivity that is very small relative to the magnetizing force represented by the maximum current flowing in the bus.

Figure 2:
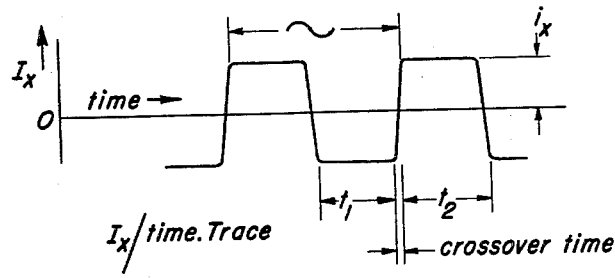
Figure 2 is a graph showing the waveform traces of exciting current against time, as developed in the system of Figure 1.

The waveform trace of the exciting current against time is shown in Figure 2. The exciting potential of the source 13 is sinusoidal but it is to be noted that the exciting current $I_x$ has an extensive region where the instantaneous value $i_x$ is constant. This is the region where the exciting current is in substantial balance against the bus current excitation and one of the cores is permeable. In this region the exciting winding of the permeable core is highly reactive and holds the current constant until the exciting potential is reversed for a sufficient time to swing the flux linkage, when the core abruptly saturates again. In this process the core is linked during the time $t_1$ and is saturated during the time $t_2$ and the interval between $t_1$ and $t_2$ is the cross-over time. The cross-over time ideally is abrupt, as shown by the sharp reversal of the current, developing a square wave wherein the crest level, $i_x$, is balancing each core in turn. Consequently $$I_x \text{ (avg.)} = i_x = I_0 \frac{N_0}{N_x}$$

In the arrangement shown in Figure 1 the circuit characteristically has an exciting current waveform that is of square form having a flat top and more or less cross-over time between the flats. The level of the current at the flats is flux-linked, whereas the cross-over time represents a system defect which varies with the excitation, load, etc. Consequently, either the average or the root-mean-square value of the exciting current will be lower than the true ratio current by a variable amount, whereas the crest value will be substantially the desired flux-linked current.

Figure 3:
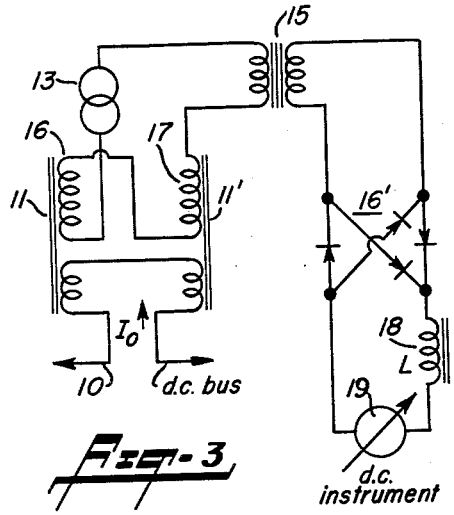
Figure 3 is a diagram of the apparatus as made in accordance with this invention.

The crest-responsive circuit arrangement of this invention is shown in Figure 3. A current transformer 15 may be used to convert the current flowing in the exciting windings 16, 17 to a relatively low order as is practical with rectifier instruments, for example, from 5 amperes to 20 milliamperes. The current transformer should have a good frequency spectrum, up to 5 kilocycles at least, to carry the abrupt cross-over current. A full-wave rectifier bridge 16 has its input diagonals connected across the secondary winding of the current transformer and its output diagonals connected to a D.-C. indicating instrument 19 through an inductance 18. The inductance 18 provides the crest-responsive action by time-transforming the potential crests produced by the crest current in its reactance. This supplies additional energy to maintain the current during the cross-over period. As a design requirement, the time-constant (inductance/circuit resistance) should be long with respect to the reciprocal of the circuit operating frequency, or the time of one cycle.

The inductance 18 may require several cycles of exciting current to reach a steady-state condition. When in the steady-state condition, the inductance is receiving a charge during the times, $t_1$ and $t_2$, when the crest level of current is impressed upon the bridge. During the cross-over time the inductance is discharging to support the output current substantially at the crest level. When, as is desirable, the time-constant $(L/R)$ is long with respect to the operating cycle, the actions of charge and discharge occur with but a minor change of current, and the current flowing in the instrument 19 is substantially constant with but little change during the cross-over time. The charging of the inductance 18 is evidenced by a reactive reflection of potential back into the diode elements comprising the rectifier network, and for accurate operation the diodes should have a very high reverse resistance characteristic to supply this potential without leakage current. The reactive potential may be considerably greater than the potential drop of the output current through the circuit resistance only, and this type of service is more critical of diode reverse resistance than is a normal instrument rectifier bridge. Because of this critical requirement for high reverse resistance, the recently-developed, diffused-junction silicon diodes are ideal for use in this crest-responsive circuit. Silicon diodes have reverse resistances exceeding 1,000 megohms, which is a substantial improvement over other solid-state diodes, and is comparable to that of thermionic diodes.

Figure 4:
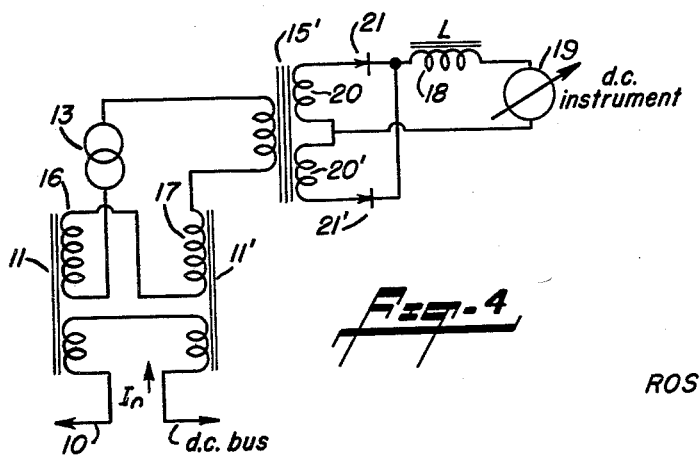
Figure 4 illustrates another embodiment of the invention.

Other conventional variations of the rectifier portion of the circuit are considered within the scope of this invention. For example, Figure 4 shows a transformer 15' having a center-tapped secondary winding 20, 20'. The instrument 19 and the inductance 18 are connected in series between the center tapped winding and the diodes 21, 21', forming a half-wave circuit familiar to practice.

The flat-topped waveform and short cross-over time, characteristic of the series transductor, are much more ideal for such a crest-responsive circuit than a sine wave would be, and the system exhibits an accuracy approaching that of the same rectifiers used in a conventional average-current responsive circuit.

Having now described my invention in detail, in accordance with the requirements of the Patent Statutes, what I desire to protect by Letters Patent of the United States, is set forth in the following claims.

I claim:

1. Apparatus for measuring the D.-C. current flowing in a conductor comprising a pair of saturable magnetizable cores magnetically coupled to the conductor; an exciting winding on each core, the exciting windings being connected in series and in opposed sense with respect to each other; a rectifier having A.-C. input junctions connected to an alternating current source in series with the exciting windings; and an output circuit connected to the D.-C. output junctions of the rectifier, said output circuit consisting of an inductor and a D.-C. indicating instrument connected in series, and the inductance of said inductor being of a magnitude sufficient to produce an exponential time-constant in the rectifier output circuit that is large with respect to the reciprocal of the frequency of the alternating current source.

2. The invention as recited in claim 1, wherein the rectifier is of the full bridge, full wave type.

3. The invention as recited in claim 1, wherein the rectifier comprises two diode elements and a phase splitting transformer.

References Cited in the file of this patent

UNITED STATES PATENTS

| | | |
|---|---|---|
| 1,813,177 | Lenehan | July 7, 1931 |
| 2,153,378 | Kramer | Apr. 4, 1939 |
| 2,605,302 | Specht | July 29, 1952 |
| 2,656,511 | Specht | Oct. 20, 1953 |

OTHER REFERENCES

Publication, "Alternating Current Circuits," textbook by Kerchner and Corcoron, 2nd edition, Mar. 1948. Pages 294 and 295.